United States Patent
Olson et al.

(10) Patent No.: US 9,569,258 B1
(45) Date of Patent: Feb. 14, 2017

(54) SCHEDULING MULTIPLE OPERATIONS IN A DIVIDER UNIT

(71) Applicant: Oracle International Corporation, Redwood City, CA (US)

(72) Inventors: Christopher Olson, Austin, TX (US); Jeffrey Brooks, Austin, TX (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 14/859,941

(22) Filed: Sep. 21, 2015

(51) Int. Cl.
  *G06F 7/38* (2006.01)
  *G06F 9/48* (2006.01)
  *G06F 9/30* (2006.01)

(52) U.S. Cl.
  CPC ........... *G06F 9/4843* (2013.01); *G06F 9/3001* (2013.01)

(58) Field of Classification Search
  CPC .................................................... G06F 9/3001
  USPC .......................................................... 712/221
  See application file for complete search history.

(56) References Cited

U.S. PATENT DOCUMENTS

| | | | |
|---|---|---|---|
| 5,204,829 A | 4/1993 | Lyu | |
| 6,175,911 B1 | 1/2001 | Oberman | |
| 2014/0149725 A1* | 5/2014 | Gherman | G01R 31/2882 712/227 |

OTHER PUBLICATIONS

Ercegovac, et al.; Improving Goldschmidt Division, Square Root and Square Root Reciprocal. [Research Report] RR-3753, 1999. <inria-00072909> .
Piso, et al.; "A new rounding algorithm for variable latency division and square root implementations;" Digital System Design Architectures, Methods and Tools, 2008. DSD '08. 11th EUROMICRO Conference on; Parma; Sep. 3-5, 2008; pp. 760-767.
"A Novel Low-power Shared Division and Square-root Architecture Using the GST Algorithm"; Broadcom Corporation, Irvine, California, US; VLSI Design Jan. 2001; 12(3). DOI: 10.1155/2001/51413.
Taek-Jun Kwon, et al; "Floating-Point Division and Square Root Implementation using a Taylor-Series Expansion; pp. 954-957 Algorithm"; Circuits and Systems, 2008. MWSCAS 2008. 51st Midwest Symposium on; Knoxville, TN; Aug. 10-13, 2008.

* cited by examiner

*Primary Examiner* — Andy Ho
(74) *Attorney, Agent, or Firm* — Meyertons, Hood, Kivlin, Kowert & Goetzel, P.C.

(57) ABSTRACT

A multiplier unit that may be configured to concurrently perform multiple division and square operations is disclosed. The multiplier unit may include multiple stages. Each stage may be configured to perform a corresponding arithmetic operation. Control circuitry coupled to the multiplier unit may be configured to schedule in a given cycle of the plurality of cycles, a respective tasks of a plurality of tasks included in a first operation for execution on a respective stage of the multiple stages. The control circuitry may be further configured to schedule execution of each tasks of a second plurality of tasks included in a second operation during a respective cycle on an unused stage of the multiple stages.

20 Claims, 8 Drawing Sheets

| Cycle | Op | bypass stage | mul1 stage | mul2 stage | add stage |
|---|---|---|---|---|---|
| 1 | scale | d0=x0*b | | | |
| 2 | scale | n0=x0*a | d0=x0*b | | |
| 3 | scale | | n0=x0*a | d0=x0*b | |
| 4 | scale | | | n0=x0*a | d0=x0*b |
| 5 | scale+iter1 | d1=r0*d0 | | | n0=x0*a |
| 6 | iter1 | n1=r0*n0 | d1=r0*d0 | | |
| 7 | iter1 | | n1=r0*no | d1=r0*d0 | |
| 8 | iter1 | | | n1=r0*no | d1=r0*d0 |
| 9 | iter1+iter2 | d2=r1*d1 | | | n1=r0*no |
| 10 | iter2 | n2=r1*n1 | d2=r1*d1 | | |
| 11 | iter2 | | n2=r1*n1 | d2=r1*d1 | |
| 12 | iter2 | | | n2=r1*n1 | d2=r1*d1 |
| 13 | iter2 | | | | n2=r1*n1 |
| 14 | last | n3=r2*n2 | | | |
| 15 | last | | n3=r2*n2 | | |
| 16 | last | | | n3=r2*n2 | |
| 17 | last | | | | n3=r2*n2 |
| 18 | back | rem=a-qb | | | |
| 19 | back | | rem=a-qb | | |
| 20 | back | | | rem=a-qb | |
| 21 | back | | | | rem=a-qb |
| 22 | round | | | | |

*FIG. 4*

Bypass stage utilization
for floating point divide
operation

| Cycle number | OP active in bypass stage |
|---|---|
| 1 | Yes |
| 2 | Yes |
| 3 | No |
| 4 | No |
| 5 | Yes |
| 6 | Yes |
| 7 | No |
| 8 | No |
| 9 | Yes |
| 10 | Yes |
| 11 | No |
| 12 | No |
| 13 | No |
| 14 | Yes |
| 15 | No |
| 16 | No |
| 17 | No |
| 18 | Yes |
| 19 | No |
| 20 | No |
| 21 | No |
| 22 | No |
| 23 | No |
| 24 | No |

FIG. 5

*Scheduling two floating point divide operations*

| Cycle number | 1st OP Active in bypass stage | 2nd OP Active in bypass stage | Operation active in bypass stage |
|---|---|---|---|
| 1 | Yes | No | 1 |
| 2 | Yes | No | 1 |
| 3 | No | Yes | 2 |
| 4 | No | Yes | 2 |
| 5 | Yes | No | 1 |
| 6 | Yes | No | 1 |
| 7 | No | Yes | 2 |
| 8 | No | Yes | 2 |
| 9 | Yes | No | 1 |
| 10 | Yes | No | 1 |
| 11 | No | Yes | 2 |
| 12 | No | Yes | 2 |
| 13 | No | No | None |
| 14 | Yes | No | 1 |
| 15 | No | No | None |
| 16 | No | Yes | 2 |
| 17 | No | No | None |
| 18 | Yes | No | 1 |
| 19 | No | No | None |
| 20 | No | Yes | 2 |
| 21 | No | No | None |
| 22 | No | No | None |
| 23 | No | No | None |
| 24 | No | No | None |

*FIG. 6*

SCHEDULING MULTIPLE OPERATIONS IN A DIVIDER UNIT

BACKGROUND

Technical Field

Embodiments described herein relate to integrated circuits, and more particularly, to techniques for performing arithmetic operations within integrated circuits.

Description of the Related Art

Computing systems typically include one or more processors or processing cores which are configured to execute program instructions. The program instructions may be stored in one of various locations within a computing system, such as, e.g., main memory, a hard drive, a CD-ROM, and the like.

Processors include various functional blocks, each with a dedicated task. For example, a processor may include an instruction fetch unit, a memory management unit, and an arithmetic logic unit (ALU). An instruction fetch unit may prepare program instruction for execution by decoding the program instructions and checking for scheduling hazards, while arithmetic operations such as addition, subtraction, and Boolean operations (e.g., AND, OR, etc.) may be performed by an ALU. Some processors include high-speed memory (commonly referred to as "cache memories" or "caches") used for storing frequently used instructions or data Some arithmetic operations may not have dedicated hardware within an ALU. Such arithmetic operations, such as, e.g., division, may be implemented as a series of program instructions making use of functional blocks within the ALU. In some cases, additional circuitry may be added to an ALU to implement one of various algorithms for performing such arithmetic operations.

SUMMARY OF THE EMBODIMENTS

Various embodiments of a multiplier unit are disclosed. Broadly speaking, a circuit and a method are contemplated in which a multiplier unit includes a plurality of stages. Each stage may be configured to perform a corresponding arithmetic operation. Control circuitry may be configured to schedule for a given cycle a given task of a first plurality of tasks associated with a first operation. The control circuitry may be further configured to schedule execution of a second plurality of tasks associated with a second operation on unused stages in the multiplier unit.

In one embodiment, the first and second operations each include one of an integer divide operation, a floating point single precision divide operation, a floating point double precision divide operation, a floating point single precision square root operation, or a floating point double precision divide operation. In a non-limiting embodiments, the first plurality of tasks includes a first plurality of steps included in a first iterative division operation, and the second plurality of tasks includes a second plurality of steps included in a second iterative division operation.

In a further embodiment, the first plurality of tasks includes a first plurality of steps included in a first iterative square root operation, and the second plurality of tasks includes a second plurality of steps include in a second iterative square root operation.

BRIEF DESCRIPTION OF THE DRAWINGS

The following detailed description makes reference to the accompanying drawings, which are now briefly described.

FIG. 4 depicts a chart illustrating multiplier stage usage during a floating point divide, integer divide, or square root operation.

FIG. 5 depicts a chart illustrating bypass stage utilization during a floating point divide, integer divide, or square root operation.

FIG. 6 depicts a chart illustrating bypass stage utilization during two concurrent floating point divide, integer divide, or square root operations.

Figure 1:
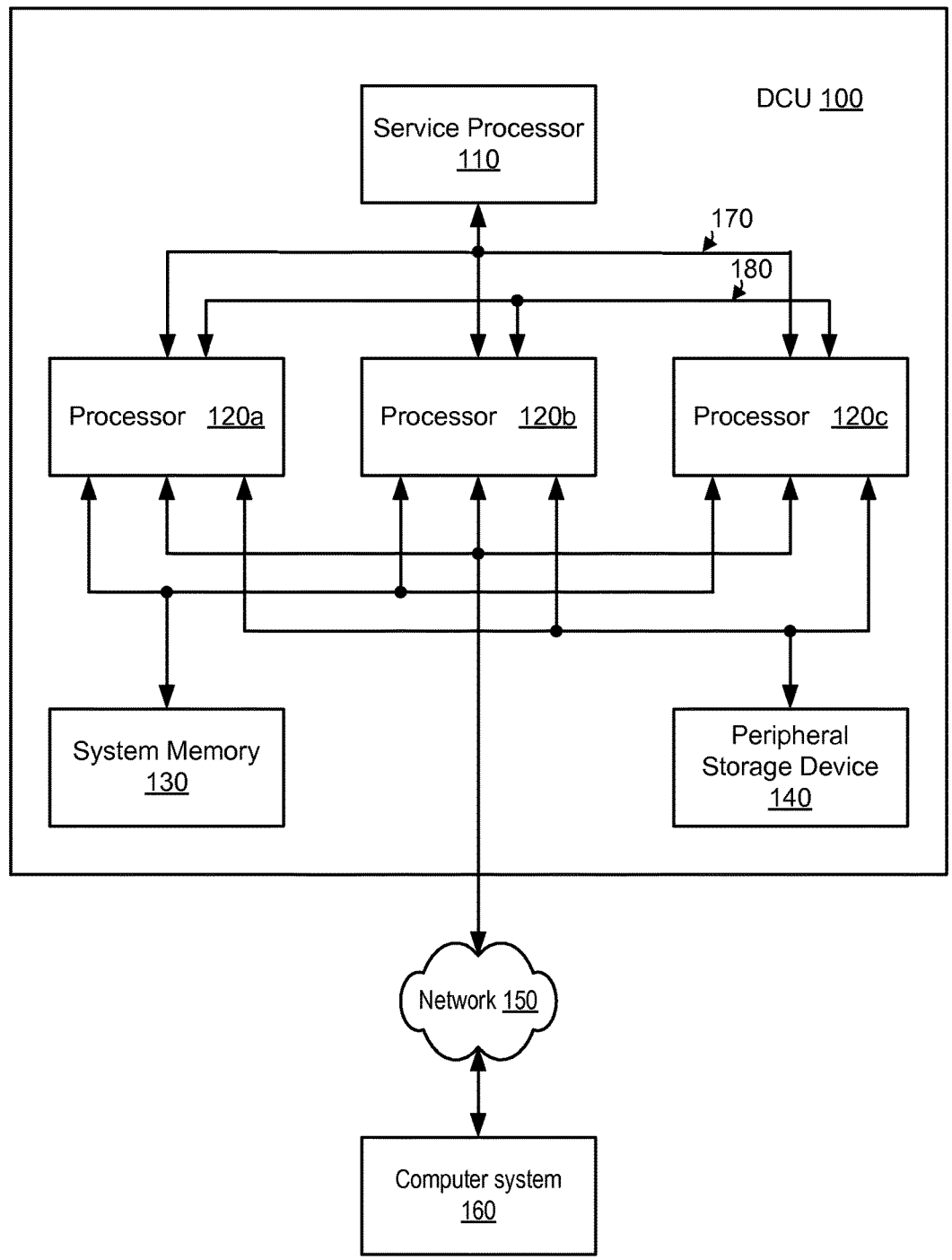
FIG. 1 illustrates an embodiment of a computing system.

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form illustrated, but on the contrary, the intention is to cover all modifications, equivalents and alternatives falling within the spirit and scope of the present disclosure as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph (f) interpretation for that unit/circuit/component. More generally, the recitation of any element is expressly intended not to invoke 35 U.S.C. §112, paragraph (f) interpretation for that element unless the language "means for" or "step for" is specifically recited.

DETAILED DESCRIPTION OF EMBODIMENTS

In a computing system, arithmetic operations may be performed by an arithmetic logic unit (ALU) of a processor. The ALU may contain dedicated logic circuits, such as, e.g., an adder or multiplier, that are designed to perform the desired arithmetic function. Some arithmetic operations, however, may be infrequently used, or may be costly, in terms of silicon area, to implement in logic circuits, may be implemented using multiple program instructions. In other cases, other logic circuits, (e.g., a multiplier) may be reused, with additional logic circuits, in an iterative fashion to perform the desired arithmetic operation.

Some operations, such as, e.g., division or square root, although infrequently used may have high latencies. Such latencies may adversely affect system performance. To remediate high latency for some operations, dedicated logic circuits may employed increasing area usage and power consumption. Using existing circuits within an ALU to perform other arithmetic operations may necessitate modifications to the existing circuits that may increase their size and power consumption. The embodiments illustrated in the drawings and described below may provide techniques for improving latency of some arithmetic operations while limiting increases in area usage and power consumption.

A block diagram illustrating one embodiment of a distributed computing unit (DCU) 100 is shown in FIG. 1. In the illustrated embodiment, DCU 100 includes a service processor 110, coupled to a plurality of processors 120a-c through bus 170. It is noted that in some embodiments, system processor 110 may additionally be coupled to system memory 130 through bus 170. Processors 120a-c are, in turn, coupled to system memory 130, and peripheral storage device 140. Processors 120a-c are further coupled to each other through bus 180 (also referred to herein as "coherent interconnect 180"). DCU 100 is coupled to a network 150, which is, in turn coupled to a computer system 160. In various embodiments, DCU 100 may be configured as a rack-mountable server system, a standalone system, or in any suitable form factor. In some embodiments, DCU 100 may be configured as a client system rather than a server system.

System memory 130 may include any suitable type of memory, such as Fully Buffered Dual Inline Memory Module (FB-DIMM), Double Data Rate, Double Data Rate 2, Double Data Rate 3, or Double Data Rate 4 Synchronous Dynamic Random Access Memory (DDR/DDR2/DDR3/DDR4 SDRAM), or Rambus® DRAM (RDRAM®), for example. It is noted that although one system memory is shown, in various embodiments, any suitable number of system memories may be employed.

Peripheral storage device 140 may, in some embodiments, include magnetic, optical, or solid-state storage media such as hard drives, optical disks, non-volatile random-access memory devices, etc. In other embodiments, peripheral storage device 140 may include more complex storage devices such as disk arrays or storage area networks (SANs), which may be coupled to processors 120a-c via a standard Small Computer System Interface (SCSI), a Fiber Channel interface, a Firewire® (IEEE 1394) interface, or another suitable interface. Additionally, it is contemplated that in other embodiments, any other suitable peripheral devices may be coupled to processors 120a-c, such as multi-media devices, graphics/display devices, standard input/output devices, etc.

In one embodiment, service processor 110 may include a field programmable gate array (FPGA) or an application specific integrated circuit (ASIC) configured to coordinate initialization and boot of processors 120a-c, such as from a power-on reset state. Additionally, in some embodiments, service processor 110 may include a programmable read-only memory (PROM) that may store instructions to perform a power-on self-test (POST). In various embodiments, service processor 110 may be configured to allow access to administrative functions such as test and debug modes of processors 120a-c, such as testing cache memories in processors 120a-c, or providing test code to processors 120a-c such that each of processors 120a-c may test their respective cache memories, for example.

As described in greater detail below, each of processors 120a-c may include one or more processor cores and cache memories. In some embodiments, each of processors 120a-c may be coupled to a corresponding system memory, while in other embodiments, processors 120a-c may share a common system memory. Processors 120a-c may be configured to work concurrently on a single computing task and may communicate with each other through coherent interconnect 180 to coordinate processing on that task. For example, a computing task may be divided into three parts and each part may be assigned to one of processors 120a-c. Alternatively, processors 120a-c may be configured to concurrently perform independent tasks that require little or no coordination among processors 120a-c.

The embodiment of the distributed computing system illustrated in FIG. 1 is one of several examples. In other embodiments, different numbers and configurations of components are possible and contemplated. It is noted that although FIG. 1 depicts a multi-processor system, the embodiments described herein may be employed with any number of processors, including a single processor core Turning now to FIG. 2, a block diagram of an embodiment of a processor 200 is shown. Processor 200 may, in some embodiments, correspond to one of processors 120a-c of DCU 100 as illustrated in FIG. 1. In the illustrated embodiment, the processor 200 includes a fetch control unit 201, an instruction cache 202, a decode unit 204, a mapper 209, a scheduler 206, a register file 207, an execution core 208, an interface unit 211, and a floating point/graphics unit (FGU) 212. The fetch control unit 201 is coupled to provide a program counter address (PC) for fetching from the instruction cache 202. The instruction cache 202 is coupled to provide instructions (with PCs) to the decode unit 204, which is coupled to provide decoded instruction operations (ops, again with PCs) to the mapper 205. The instruction cache 202 is further configured to provide a hit indication and an ICache PC to the fetch control unit 201. The mapper 205 is coupled to provide ops, a scheduler number (SCH#), source operand numbers (SO#s), one or more dependency vectors, and PCs to the scheduler 206. The scheduler 206 is coupled to receive replay, mispredict, and exception indications from the execution core 208, is coupled to provide a redirect indication and redirect PC to the fetch control unit 201 and the mapper 205, is coupled to the register file 207, and is coupled to provide ops for execution to the execution core 208. The register file is coupled to provide operands to the execution core 208, and is coupled to receive results to be written to the register file 207 from the execution core 208. The execution core 208 is coupled to the interface unit 211, which is further coupled to an external interface of the processor 200.

Fetch control unit 201 may be configured to generate fetch PCs for instruction cache 202. In some embodiments, fetch control unit 201 may include one or more types of branch predictors 212. For example, fetch control unit 202 may include indirect branch target predictors configured to predict the target address for indirect branch instructions, conditional branch predictors configured to predict the outcome of conditional branches, and/or any other suitable type of branch predictor. During operation, fetch control unit 201 may generate a fetch PC based on the output of a selected branch predictor. If the prediction later turns out to be incorrect, fetch control unit 201 may be redirected to fetch from a different address. When generating a fetch PC, in the absence of a nonsequential branch target (i.e., a branch or other redirection to a nonsequential address, whether speculative or non-speculative), fetch control unit 201 may generate a fetch PC as a sequential function of a current PC value. For example, depending on how many bytes are fetched from instruction cache 202 at a given time, fetch control unit 201 may generate a sequential fetch PC by adding a known offset to a current PC value.

The instruction cache 202 may be a cache memory for storing instructions to be executed by the processor 200. The instruction cache 202 may have any capacity and construction (e.g. direct mapped, set associative, fully associative, etc.). The instruction cache 202 may have any cache line size. For example, 64 byte cache lines may be implemented in an embodiment. Other embodiments may use larger or smaller cache line sizes. In response to a given PC from the fetch control unit 201, the instruction cache 202 may output up to a maximum number of instructions. It is contemplated that processor 200 may implement any suitable instruction set architecture (ISA), such as, e.g., the ARM™, PowerPC™, or x86 ISAs, or combinations thereof.

In some embodiments, processor 200 may implement an address translation scheme in which one or more virtual address spaces are made visible to executing software. Memory accesses within the virtual address space are translated to a physical address space corresponding to the actual physical memory available to the system, for example using a set of page tables, segments, or other virtual memory translation schemes. In embodiments that employ address translation, the instruction cache 202 may be partially or completely addressed using physical address bits rather than virtual address bits. For example, instruction cache 202 may use virtual address bits for cache indexing and physical address bits for cache tags.

In order to avoid the cost of performing a full memory translation when performing a cache access, processor 200 may store a set of recent and/or frequently-used virtual-to-physical address translations in a translation lookaside buffer (TLB), such as Instruction TLB (ITLB) 203. During operation, ITLB 203 (which may be implemented as a cache, as a content addressable memory (CAM), or using any other suitable circuit structure) may receive virtual address information and determine whether a valid translation is present. If so, ITLB 203 may provide the corresponding physical address bits to instruction cache 202. If not, ITLB 203 may cause the translation to be determined, for example by raising a virtual memory exception.

The decode unit 204 may generally be configured to decode the instructions into instruction operations (ops). Generally, an instruction operation may be an operation that the hardware included in the execution core 208 is capable of executing. Each instruction may translate to one or more instruction operations which, when executed, result in the operation(s) defined for that instruction being performed according to the instruction set architecture implemented by the processor 200. In some embodiments, each instruction may decode into a single instruction operation. The decode unit 204 may be configured to identify the type of instruction, source operands, etc., and the decoded instruction operation may include the instruction along with some of the decode information. In other embodiments in which each instruction translates to a single op, each op may simply be the corresponding instruction or a portion thereof (e.g. the opcode field or fields of the instruction). In some embodiments in which there is a one-to-one correspondence between instructions and ops, the decode unit 204 and mapper 205 may be combined and/or the decode and mapping operations may occur in one clock cycle. In other embodiments, some instructions may decode into multiple instruction operations. In some embodiments, the decode unit 16 may include any combination of circuitry and/or microcoding in order to generate ops for instructions. For example, relatively simple op generations (e.g. one or two ops per instruction) may be handled in hardware while more extensive op generations (e.g. more than three ops for an instruction) may be handled in microcode.

Ops generated by the decode unit 204 may be provided to the mapper 205. The mapper 205 may implement register renaming to map source register addresses from the ops to the source operand numbers (SO#s) identifying the renamed source registers. Additionally, the mapper 205 may be configured to assign a scheduler entry to store each op, identified by the SCH#. In an embodiment, the SCH# may also be configured to identify the rename register assigned to the destination of the op. In other embodiments, the mapper 205 may be configured to assign a separate destination register number. Additionally, the mapper 205 may be configured to generate dependency vectors for the op. The dependency vectors may identify the ops on which a given op is dependent. In an embodiment, dependencies are indicated by the SCH# of the corresponding ops, and the dependency vector bit positions may correspond to SCH#s. In other embodiments, dependencies may be recorded based on register numbers and the dependency vector bit positions may correspond to the register numbers.

The mapper 205 may provide the ops, along with SCH#, SO#s, PCs, and dependency vectors for each op to the scheduler 206. The scheduler 206 may be configured to store the ops in the scheduler entries identified by the respective SCH#s, along with the SO#s and PCs. The scheduler may be configured to store the dependency vectors in dependency arrays that evaluate which ops are eligible for scheduling. The scheduler 206 may be configured to schedule the ops for execution in the execution core 208. When an op is scheduled, the scheduler 206 may be configured to read its source operands from the register file 207 and the source operands may be provided to the execution core 208. The execution core 208 may be configured to return the results of ops that update registers to the register file 207. In some cases, the execution core 208 may forward a result that is to be written to the register file 207 in place of the value read from the register file 207 (e.g. in the case of back to back scheduling of dependent ops).

The execution core 208 may also be configured to detect various events during execution of ops that may be reported to the scheduler. Branch ops may be mispredicted, and some load/store ops may be replayed (e.g. for address-based conflicts of data being written/read). Various exceptions may be detected (e.g. protection exceptions for memory accesses or for privileged instructions being executed in non-privileged mode, exceptions for no address translation, etc.). The exceptions may cause a corresponding exception handling routine to be executed.

The execution core 208 may be configured to execute predicted branch ops, and may receive the predicted target address that was originally provided to the fetch control unit 201. The execution core 208 may be configured to calculate the target address from the operands of the branch op, and to compare the calculated target address to the predicted target address to detect correct prediction or misprediction. The execution core 208 may also evaluate any other prediction made with respect to the branch op, such as a prediction of the branch op's direction. If a misprediction is detected, execution core 208 may signal that fetch control unit 201 should be redirected to the correct fetch target.

Other units, such as the scheduler 206, the mapper 205, and the decode unit 204 may flush pending ops/instructions from the speculative instruction stream that are subsequent to or dependent upon the mispredicted branch.

Execution unit 208 may also be configured to execute and provide results for certain types of fetched instructions. In one embodiment, execution unit 208 may be configured to execute certain integer-type instructions defined in the implemented ISA, such as arithmetic, logical, and shift instructions. It is noted that in the illustrated embodiment instructions destined for floating point/graphics unit (FGU) 212 pass through execution unit 208. However, in alternative embodiments it is contemplated that such instructions may be issued directly to their respective units without passing through execution unit 208.

The execution core may include a data cache 209, which may be a cache memory for storing data to be processed by the processor 200. Like the instruction cache 202, the data cache 209 may have any suitable capacity, construction, or line size (e.g. direct mapped, set associative, fully associative, etc.). Moreover, the data cache 209 may differ from the instruction cache 202 in any of these details. As with instruction cache 202, in some embodiments, data cache 209 may be partially or entirely addressed using physical address bits. Correspondingly, a data TLB (DTLB) 210 may be provided to cache virtual-to-physical address translations for use in accessing the data cache 209 in a manner similar to that described above with respect to ITLB 203. It is noted that although ITLB 203 and DTLB 210 may perform similar functions, in various embodiments they may be implemented differently. For example, they may store different numbers of translations and/or different translation information.

Floating point unit (FPU) 212 may be configured to execute and provide results for certain floating-point and graphics-oriented instructions defined in the implemented ISA. For example, in one embodiment FGU 212 may implement single- and double-precision floating-point arithmetic instructions compliant with a version of the Institute of Electrical and Electronics Engineers (IEEE) 754 Standard for Binary Floating-Point Arithmetic (more simply referred to as the IEEE 754 standard), such as add, subtract, multiply, divide, and certain transcendental functions. Depending on the implementation of FGU 212, may include multiplier unit 213. As described below in more detail, multiplier unit 213 may be employed in an iterative fashion to approximate values for multiple arithmetic operations, such as, e.g., division and square root, in parallel.

The register file 207 may generally include any set of registers usable to store operands and results of ops executed in the processor 200. In some embodiments, the register file 207 may include a set of physical registers and the mapper 205 may be configured to map the logical registers to the physical registers. The logical registers may include both architected registers specified by the instruction set architecture implemented by the processor 200 and temporary registers that may be used as destinations of ops for temporary results (and sources of subsequent ops as well). In other embodiments, the register file 207 may include an architected register set containing the committed state of the logical registers and a speculative register set containing speculative register state.

The interface unit 211 may generally include the circuitry for interfacing the processor 200 to other devices on the external interface. The external interface may include any type of interconnect (e.g. bus, packet, etc.). The external interface may be an on-chip interconnect, if the processor 200 is integrated with one or more other components (e.g. a system on a chip configuration). The external interface may be on off-chip interconnect to external circuitry, if the processor 200 is not integrated with other components. In various embodiments, the processor 200 may implement any instruction set architecture.

Figure 2:
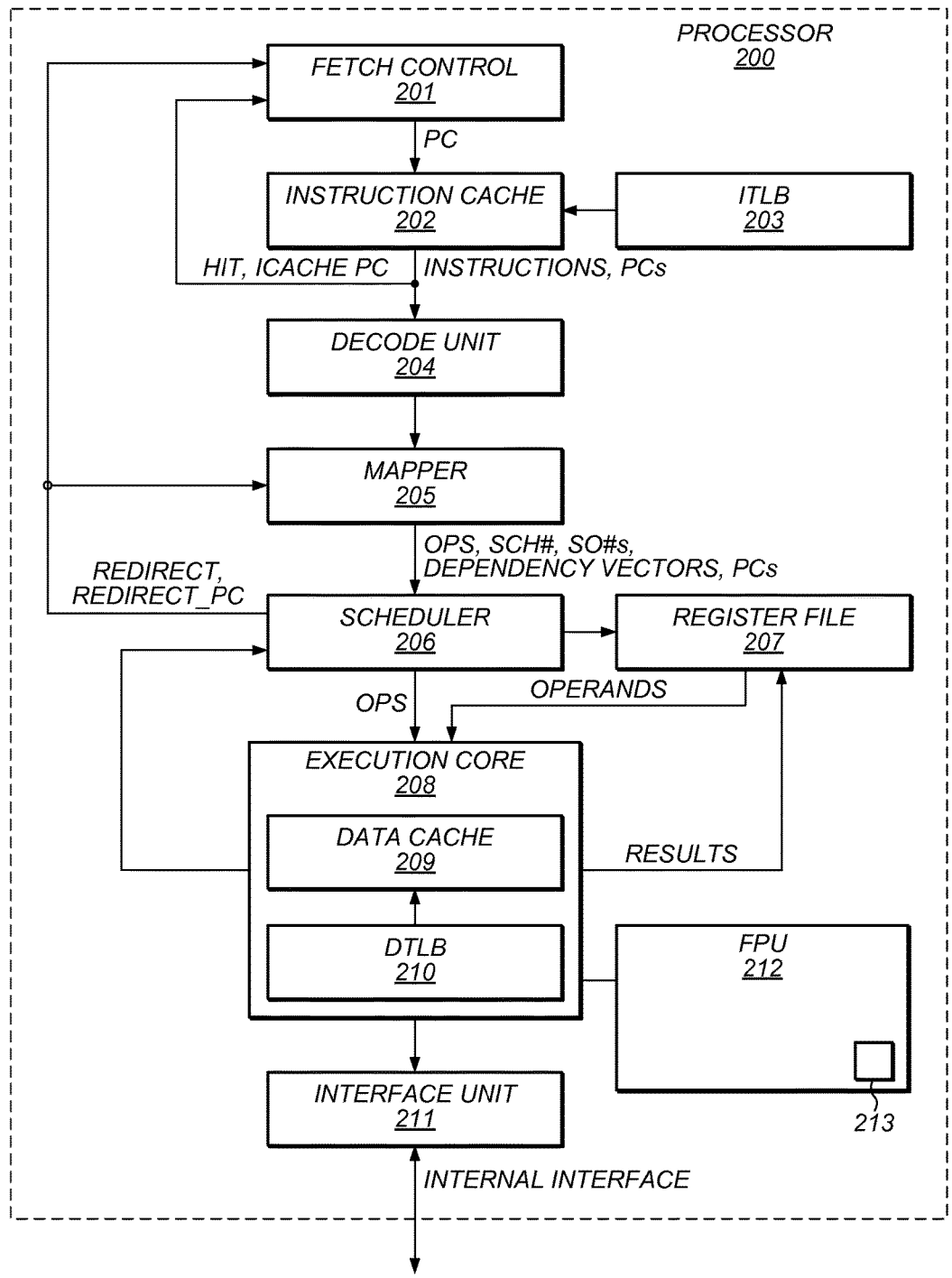
FIG. 2 illustrates an embodiment of a processor.

It is noted that the embodiment of a processing device illustrated in FIG. 2 is merely an example. In other embodiments, different functional block or configurations of functional blocks are possible and contemplated.

Computing systems, such as, e.g., DCU 100 as illustrated in FIG. 1, may be limited in area due to manufacturing cost or form factor considerations. To keep within area targets, circuit and logic designers may elect to implement certain functions as a set of software instructions, thereby trading processing efficiency for area. In other cases, some functions may re-use other hardware in a different fashion to perform the desired function. Examples of such re-use include division and square root operations that make use of multiplier unit hardware to implement the desired operation without creating dedicated hardware. In such cases, additional logic circuits may be added to a multiplier unit to allow one of various division or square root algorithms to be performed, such as, a Goldschmidt algorithm, for example.

As shown in equation 1, a quotient Q may be written as a product of a dividend a and a reciprocal of a divisor b. In the case of the Goldschmidt algorithm, an initial approximation of the reciprocal of the divisor is refined through multiple iterations, until a desired level of accuracy is achieved. In various embodiments, a final value of the divisor may be rounded. The final quotient may then be realized through a multiplication of the dividend by the estimated divisor.

$$Q = a/b = a(1/b) \tag{1}$$

As shown in equation 2, during each iteration, a next value of the numerator, $N_{i+1}$, is dependent upon a multiplication of a current value of the numerator, $N_i$, a current scaling value $R_i$, and a next value of the denominator, $D_{i+1}$, is dependent upon a multiplication of a current value of the denominator, $D_i$, and $R_i$. The next value of the scaling factor, $R_{i+1}$, is derived from the current value of the scaling factor. By employing independent multiplications, the multiplication may, in various embodiments be pipelined through a multiplier, allowing for higher throughput.

$$N_{i+1} = N_i R_i$$

$$D_{i+1} = D_i R_i$$

$$R_{i+1} = 2 - R_i \tag{2}$$

It is noted that although the above discussion is generally directed towards division, in other embodiments, similar techniques may be applied to other arithmetic operations. For example, square root may be performed by using the function $1/\sqrt{x}$ instead of merely a reciprocal of a divisor as is the case with a division operation.

Figure 3:
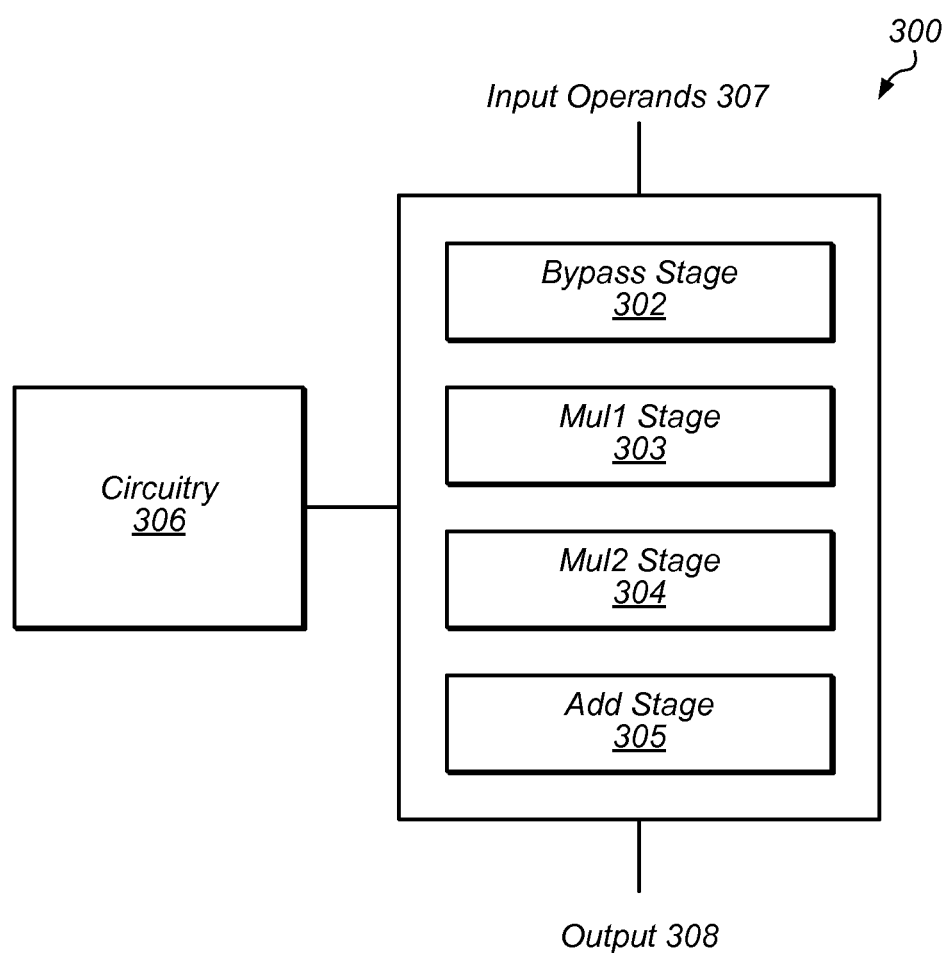
FIG. 3 illustrates an embodiment of a multiplier unit.

Turning to FIG. 3, an embodiment of multiplier unit is illustrated. In the illustrated embodiment, multiplier unit 300 includes bypass stage 302, mul1 stage 303, mul2 stage 303, add stage 304, and circuitry 305. Multiplier unit 300 may, in some embodiments, be used to implement one of various algorithms, such as Newton-Raphson or Goldschmidt, for example. In various embodiments, multiplier unit 300 may be configured to produce an approximation of a quotient of two floating point numbers, a quotient of two integer numbers, or an approximation of a square root of a floating point number.

Each of bypass stage 302, mul1 stage 303, mul2 stage 304, and add stage 305 may be configured to multiply at least two operands, and may be designed in accordance with one of various multiplier architectures. For example, any of the aforementioned stages may employ Wallace tree, or other suitable multiplier algorithm. In various embodiments, multiplier may be configured to allow operands of any suitable length, such as, e.g., integer or floating point operands.

During operation when multiplier unit 300 is used to perform a first iterative operation such as, e.g., floating point division, integer division, or square root, input operands 307 are received by bypass stage 302, which, in turn, performs a first calculation of the iterative operation during a first processing cycle. For example, bypass stage 302 may calculate a value for a denominator according to equation 2. During a second processing cycle, bypass stage 302 may pass its results to mul1 stage 303 and calculate a value for a numerator according to equation 2. Mul1 stage 303 may calculate an updated value for the denominator during the second processing cycle. The process may continue, as described below in more detail in regard to FIG. 4, in a pipelined fashion, over a suitable number of processing cycles, until final values for numerator, denominator, and remainder are calculated. A final answer may then be sent to output 308.

While the first iterative operation is being executed, circuitry 306 may schedule a second iterative operation for execution. In various embodiments, circuitry 306 may schedule a particular calculation of the second iterative operation to be executed on an unused stage. For example, after bypass stage 302 completed the calculation of the numerator of the first iterative operation in cycle 2, it may not be used for two subsequent processing cycles. Circuitry 306 may schedule the calculation of an initial value of a numerator of the second iterative operation for execution on bypass stage 302 during a third processing cycle. Other calculations included in the second iterative operation may be schedule for execution in a similar fashion.

When scheduling the execution of the calculations included in the second iterative operation, circuitry 306 may use patterns of usage of the various stages by each of the first and second iterative operations do determine when a particular stage is unused during a given processing cycle. In some embodiments, circuitry 306 may employ predetermined usage patterns which may be selected dependent upon the type of operation, such as, floating point division, for example.

In some embodiments, circuitry 306 may determine cycles in which there are unused stages while two iterative operations are being performed. In such cases, circuitry 306 may schedule single cycle operations, such as, e.g., integer multiplication, for execution on the unused stages during a given processing cycle. By allowing a single cycle operation to be included with the two iterative operations, multiplier 300 may, in various embodiments, improving utilization and reduce latency.

In situations where a calculation included in the second iterative operation is schedule for execution on a stage at the same time a calculation from the first iterative operation is schedule, circuitry 306 may stall execution of the calculation from the second iterative operation until the calculation from the first iterative operation has completed.

It is noted that the embodiment illustrated in FIG. 3 is merely an example. In other embodiments, different numbers of stages and different configurations of functional stages are possible and contemplated.

Turning to FIG. 4, a chart depicting multiplier stage usage during a floating point divide, integer divide, or square root operation is illustrated. In the present illustration, the usage pattern of a floating point divide, integer divide, or square root operation using the Goldschmidt algorithm is depicted. In the chart depicted in FIG. 4, the variables a and b represent floating point numbers. Additionally, x0 represents an initial approximation of 1/b or 1/sqrt(b), q0 represents the quotient of a and b, and r0, r1, and r2, represent remainders from a given iteration. In the first processing cycle, a bypass stage, such as, e.g., bypass stage 302 of multiplier 300 as illustrated in FIG. 3, begins the calculation of an initial value for a denominator in accordance with the Goldschmidt algorithm. The other stages, mul1, mul2, and add, are idle.

In the second processing cycle, the mul1 stage receives results from the bypass stage, and continues the calculation of the initial value of the denominator. The bypass stage then begins the calculation of an initial value of a numerator in accordance with the Goldschmidt algorithm. The stages mul2 and add remain idle during the second processing cycle.

Moving to the third processing cycle, the bypass stage becomes idle, while the mul1 stage continues the calculation of the initial value of the numerator. The mul2 stage becomes active and continues the calculation of the initial value of the denominator, while the add stage remains idle. In the fourth processing cycle, both the bypass and mul1 stages are idle. The mul2 stage continues the calculation of the initial value of the numerator value, while the add stage becomes active and completes the calculation of the initial value of the denominator.

In the fifth processing cycle, the bypass stage can begin the calculation of a second value of the denominator since the add stage completed the calculation of the initial value of the denominator. The mul1 stage and the mul2 stage are idle, while the add stage completes the calculation of the initial value of the numerator.

In a similar fashion, each subsequent value of both the denominator and numerator are calculated by the various stages in a pipelined fashion. As final results for a given iteration become available, a new iteration may begin in the bypass stage. It this present example, four iterations are performed, each generating a new result for the numerator and denominator. The values from the final iteration may then be used to calculate values for the desired quotient and remainder.

It is noted that the chart depicted in FIG. 4 is merely an example. In other embodiments, the use of different algorithms may result in different calculations being performed in different cycles and on different stages.

As evident in the chart of FIG. 4, not all stages within a multiplier unit are in use each cycle during an iterative operation, such as, a floating point divide operation, for example. To take advantage of the unused stages, new operations may be started when the bypass stage is idle. Turning to FIG. 5, a chart illustrating bypass stage utilization during a floating point divide operation is depicted.

In the first and second processing cycles, the bypass stage is active. The values to start the next iteration of the calculation for the denominator are not available unit the fifth cycles. As a result, the next iteration of calculation of the denominator and numerator values cannot be started until the fifth processing cycle, leaving the bypass stage idle for processing cycles three and four. In a similar fashion, the bypass stage is idle for processing cycles 7, 8, 11, 12, 13, 15, 16, 17, and 19-24, resulting the multiplier being utilized 36% of the time.

It is noted that bypass stage utilization depicted in FIG. 5 is merely an example. In other embodiments, different number of pipe stages within a multiplier unit may result in different bypass stage utilization.

The unused stages may be used, in various embodiments, to perform a second iterative operation. A chart depicting the scheduling of two iterative operations in a single pipelined multiplier unit is illustrated in FIG. 6. As with the chart depicted in FIG. 5, a first iterative operation is started in processing cycle one, which results in the bypass stage being active for processing cycles one and two.

In processing cycle 3, however, instead of having the bypass stage be idle while it waits for results from the first iteration of the first iterative operation, a second iterative operation is started. The bypass stage is not active beginning the calculation for initial values for the denominator and numerator for the second iterative operation in processing cycles 3 and 4.

In processing cycles 5 and 6, the bypass stage begins the calculation of values for the next iteration of the first operation. At processing cycle 7, the results from the first iteration of the second operation are available for use in starting the second iteration of the second operation. The bypass stage may then spend processing cycles 7 and 8 beginning the calculation of values for the denominator and numerator for the second iteration of the second operation. In a similar fashion, the two operations continue to make sure of the bypass stage throughout the rest of the processing cycles. It is noted that the two operations are both being executed at the full speed of the processing, and that, once started, the control for the second operation is identical to the control for the first operation.

With two iterative operations running within the multiplier unit, 33% of the cycles are still available to perform work. In some embodiments, a third iterative operation may be scheduled to take advantage remaining free processing cycles. Alternatively or additionally, the free processing cycles may be used to execute single cycle instructions, further increasing the utilization of the multiplier unit.

It is noted that the scheduling depicted in the chart of FIG. 6 is merely an example. In other embodiments, the second iterative operation may be initiated at any suitable cycle where the bypass stage is unused and does not result in conflicts with multiple calculations schedule for a given stage at a same time.

Figure 7:
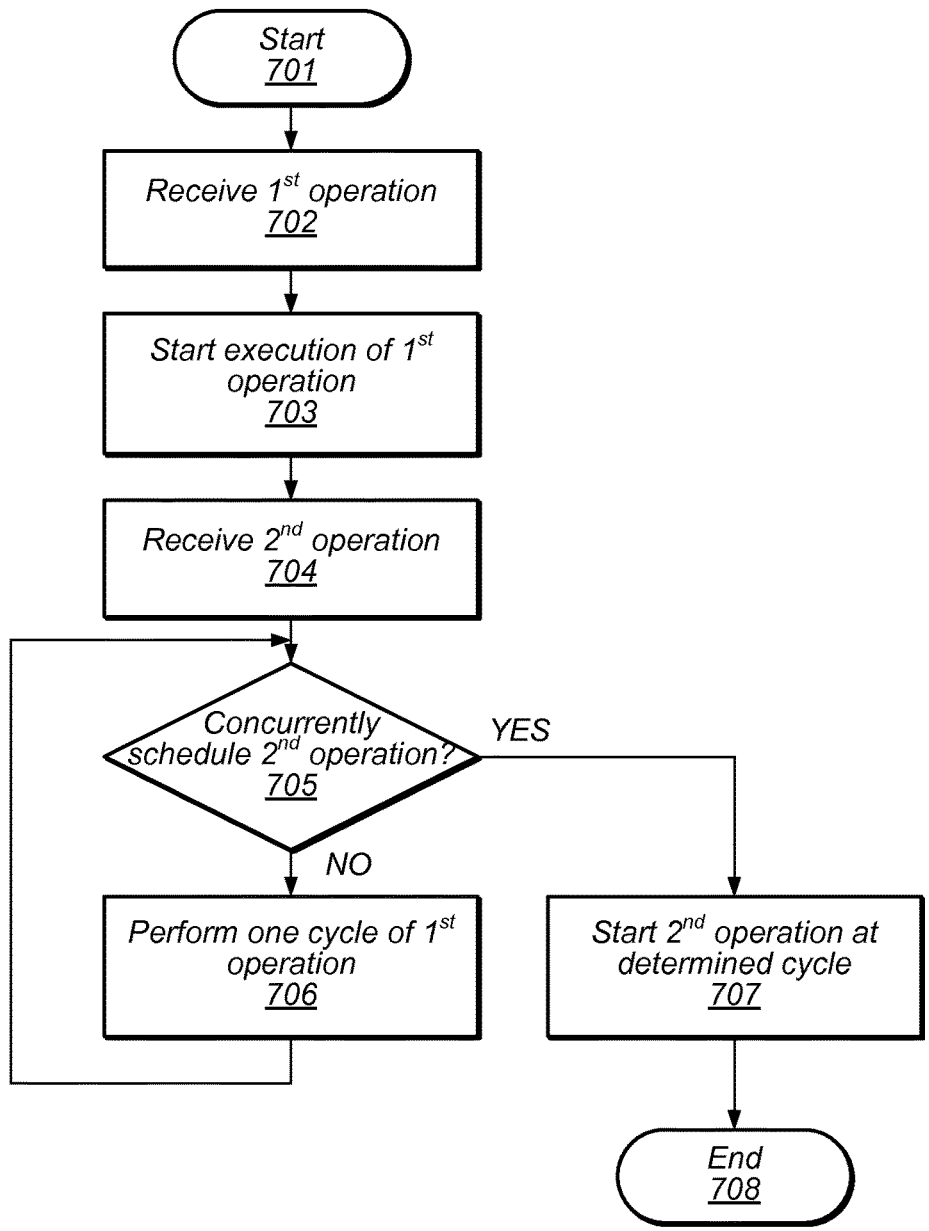
FIG. 7 depicts a flow diagram illustrating an example method for operating a multiplier unit to perform two concurrent operations.

Turning to FIG. 7 a flow diagram illustrating an embodiment of concurrently performing two operations using a multiplier operation is depicted. The method begins in block 701. A multiplier unit, such as, e.g., multiplier unit 300 as illustrated in FIG. 3 may then receive a first operation (block 702). In various embodiments, the first operation may be a single or double floating point precision division operation, an integer division operation, or a single or double precision floating point square root operation. The multiplier unit may be configured to implement an iterative algorithm, such as, e.g., the Goldschmidt operation, to perform the division of square root operation using a series of multiplication operations.

The execution of the first operation may then begin (block 703). In various embodiments, control circuitry, such as, e.g., control circuitry 303 as depicted in FIG. 3, may schedule different iterations of the iterative operation on different stages within the multiplier unit. Each iteration may be executed during a different cycle, allowing pipeline operation of the multiplier unit.

A second operation may then be received (block 704). In various embodiments, the second operation may also be a single or double precision floating point division operation, an integer division operation, or a single or double precision floating point square root operation. It is noted that although the flow diagram depicts the second operation as being received after the start of execution of the first operation, it other embodiments, the second operation may be received concurrently with the first operations, or at any other suitable time. The operation may then depend on if the second operation may be scheduled concurrently with the first operation (block 705).

If the second operation may be scheduled concurrently, then the control circuitry may schedule the second operation to start at a determined cycle (block 707). In some embodiments, control circuitry may determine a number of cycles to wait after the start of the first operation to allow iterations of the second operation to be performed on stages of the multiplier unit that are not currently being used for the first operation. Once the second operation has been started, the method may conclude in block 708.

Alternatively, if the second operation cannot be scheduled concurrently, one cycle of the first operation may be performed (block 706). Once the cycle has been completed, the method may then proceed from block 705 as described above.

It is noted that the embodiment illustrated is merely an example. In other embodiments, different operations and different orders of operations may be employed.

Figure 8:
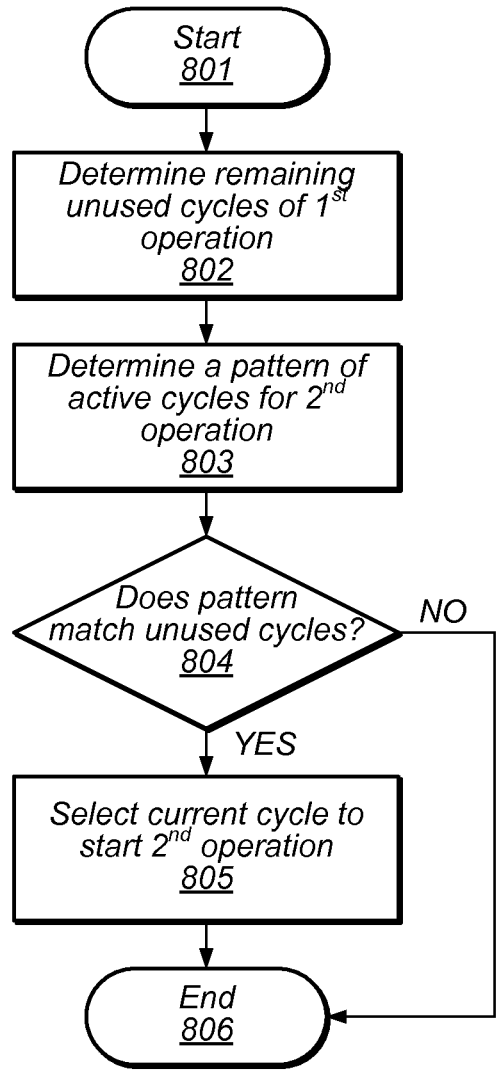
FIG. 8 depicts a flow diagram illustrating an example method for determining if a second operation may be executed concurrently with a first operation being executed by a multiplier unit.

A flow diagram depicting an embodiment of a method for determining if a second operation may be executed concurrently with a first operation in a multiplier unit is illustrated in FIG. 8. In various embodiments, the method illustrated in FIG. 8 may correspond to block 705 of the flow diagram depicted in FIG. 7. The method begins in block 801.

Remaining cycles that have that include multiplier stages unused by the first operation may then be determined (block 802). As illustrated in FIG. 5, not all of the stages of a multiplier will be active for a single or double precision floating point division, integer division, or single or double precision square root operation. In such cases, cycles that have an unused multiplier stage will be identified. A pattern of multiplier stage usage per cycle may then be determined for the second operation (block 803). In some embodiments, the second operation may a single or double precision floating point division operation, an integer division operation, or a single or double precision floating point square root operation. In other embodiments, the second operation may be any suitable operation. The method may then depend on if the usage pattern of the second operation matches the pattern of remaining unused stages in the multiplier while executing the first operation (block 804).

If the usage pattern of the second operation does not match the pattern of unused stages, then the method concludes in block 806. In various embodiments, if an iteration of the second operation would be scheduled to be executed by a given multiplier stage that is already schedule for executing an iteration of the first operation, the second operation may stall for a processing cycle and, as described above in regard to FIG. 7, circuitry may re-check for conflict after the processing cycle has completed.

If, however, the usage pattern of the second operation matches the pattern of unused stages, then a starting cycle for the second operation may be determined (block 805). In some embodiments, the second operation may be started at the first available free processing cycle, while in other embodiments, any suitable free processing cycle may be selected to start the second operation.

It is noted that the method depicted in the flow diagram illustrated in FIG. 8 is merely an example. In other embodiments, different operations, and different orders of operations may be employed.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
  a multiplier unit including a plurality of stages, wherein each stage of the plurality of stages is configured to perform a corresponding arithmetic operation; and
  control circuitry coupled to the multiplier unit, wherein the control circuitry is configured to:
    schedule, for each cycle of a plurality of cycles, execution of respective task of a first plurality of tasks included in a first operation on a respective stage of the plurality of stages; and
    schedule execution of each task of a second plurality of tasks included in a second operation, during a respective cycle of the plurality of cycles, on an unused stage of the plurality of stages.

2. The apparatus of claim 1, wherein the first operation and the second operation each comprise one of an integer divide operation, a floating point single precision divide operation, a floating point double precision divide operation, a floating point single precision square root operation, or a floating point double precision square root operation.

3. The apparatus of claim 1, wherein the first plurality of tasks include first plurality of steps included in a first iterative division operation, and wherein the second plurality of tasks include a second plurality of steps includes in a second iterative division operation.

4. The apparatus of claim 1, wherein the first plurality of tasks include first plurality of steps included in a first iterative square root operation, and wherein the second plurality of tasks include a second plurality of steps included in a second iterative square root operation.

5. The apparatus of claim 1, wherein the first operation and the second operation each comprise a floating point double precision square root operation.

6. The apparatus of claim 1, wherein to schedule, for each cycle of the plurality of cycles, execution of respective task of the first plurality of tasks, the control circuitry is further configured to schedule execution of a first task of the first plurality of tasks on a first stage of the plurality of stages during a first cycle of the plurality of cycles.

7. The apparatus of claim 6, wherein to schedule execution of each task of the second plurality of tasks included in the second operation, the control circuitry is further configured to schedule execution of a second task of the second plurality of tasks on the first stage of the plurality of stages during a second cycle of the plurality of cycles, wherein the second cycle is different from the first cycle.

8. A method, comprising:
  receiving a first operation and second operation by an arithmetic unit, wherein the arithmetic unit includes a plurality of stages;
  executing the first operation by the arithmetic unit;
  identifying a first subset of a plurality of cycles where a given stage of the plurality of stages is unused in executing the first operation; and
  scheduling execution of the second operation dependent upon the first subset of the plurality of cycles.

9. The method of claim 8, wherein scheduling execution of the second operation comprises delaying a number of cycles from an initial cycle of the plurality of cycles before starting execution of the second operation.

10. The method of claim 8, further comprising identifying a second subset of the plurality of cycles, wherein during each cycle of the second subset of the plurality of cycles the given stage of the plurality of stages is unused in executing the first operation and executing the second operation.

11. The method of claim 10, further comprising scheduling a third operation dependent upon the second subset of the plurality of cycles.

12. The method of claim 11, wherein the first operation includes a first double precision operation, wherein the second operation includes a second double precision operation, and wherein the third operation includes a first single precision operation.

13. The method of claim 8, wherein executing the first operation includes performing an iterative division operation.

14. The method of claim 8, wherein executing the first operation includes performing an iterative square root operation.

15. A system, comprising:
  a memory; and
  a processor coupled to the memory, wherein the processor is configured to:
    receive a plurality of program instructions from the memory;
    execute, over a plurality of cycles, a first operation dependent upon a first program instruction of the plurality of program instructions;
    identify a first subset of the plurality of cycles, wherein during each cycle in the plurality of cycles a given stage of an arithmetic unit is unused in execution of the first operation; and
    schedule execution of second operation dependent upon a second program instruction of the plurality of program instructions and the first subset of the plurality of cycles.

16. The system of claim 15, wherein the processor is further configured to identify a second subset of the plurality of cycles, wherein during each cycle of the second subset of the plurality of cycles the given stage of the arithmetic unit is unused in execution of the first operation and in execution of the second operation.

17. The system of claim 16, wherein the processor is further configured to schedule execution of a third operation dependent upon a third program instruction of the plurality of program instructions and the second subset of the plurality of cycles.

18. The system of claim 15, wherein to execute the first operation, the processor is further configured to perform a plurality of tasks associated with an iterative division operation.

19. The system of claim 15, wherein to execute the first operation, the processor is further configured to perform a plurality of tasks associated with an iterative square root operation.

20. The system of claim 15, wherein the first operation includes a first double precision operation, and wherein the second operation includes a second double precision operation.

* * * * *

UNITED STATES PATENT AND TRADEMARK OFFICE
CERTIFICATE OF CORRECTION

| | | |
|---|---|---|
| PATENT NO. | : 9,569,258 B1 | Page 1 of 1 |
| APPLICATION NO. | : 14/859941 | |
| DATED | : February 14, 2017 | |
| INVENTOR(S) | : Olson et al. | |

It is certified that error appears in the above-identified patent and that said Letters Patent is hereby corrected as shown below:

In the Specification

In Column 1, Line 27, after "data" insert -- . --.

In Column 4, Line 23, after "core" insert -- . --.

In Column 9, Line 19, delete "Mull" and insert -- Mul1 --, therefor.

Signed and Sealed this
Second Day of January, 2018

Joseph Matal
*Performing the Functions and Duties of the*
*Under Secretary of Commerce for Intellectual Property and*
*Director of the United States Patent and Trademark Office*